Figure 8:
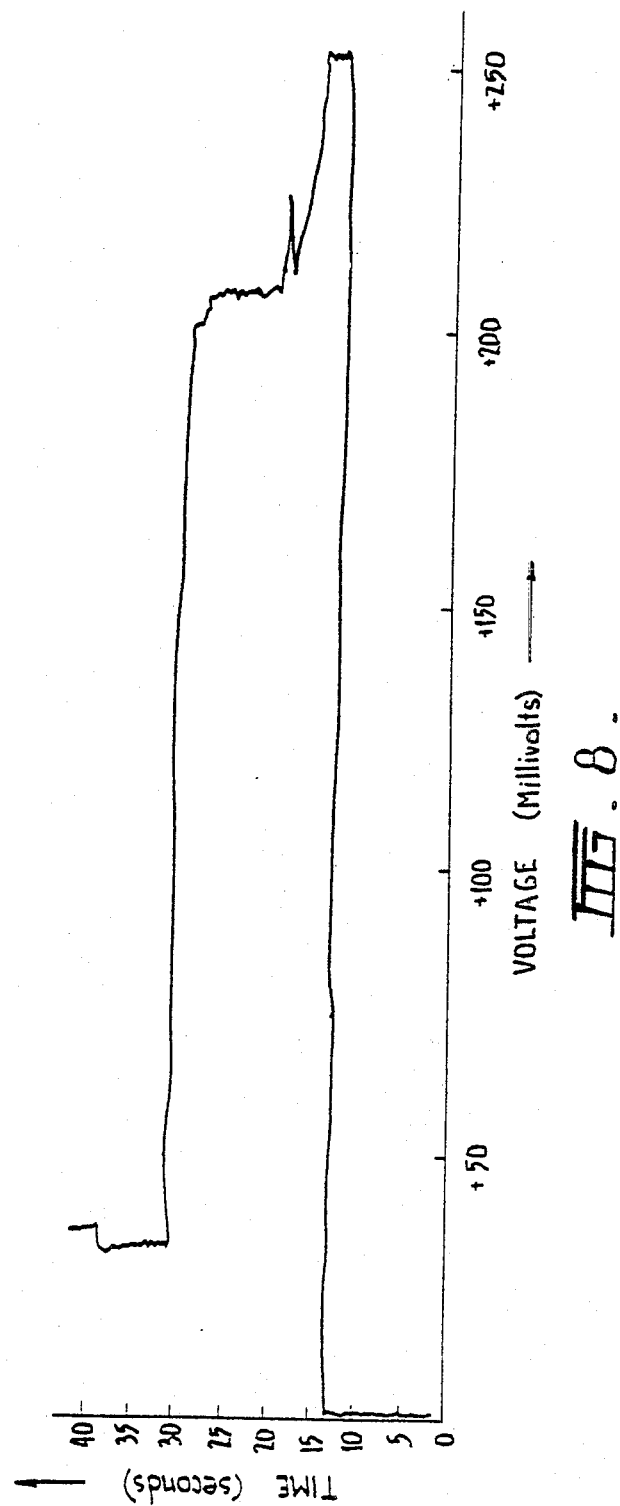

United States Patent [19]

Kemlo

[11] 4,235,423
[45] Nov. 25, 1980

[54] INDICATION OF LEVELS IN RECEPTACLES

[75] Inventor: Kenneth G. Kemlo, Lambton, Australia

[73] Assignee: The Broken Hill Proprietary Company Limited, Victoria, Australia

[21] Appl. No.: 9,944

[22] Filed: Feb. 6, 1979

Related U.S. Application Data

[62] Division of Ser. No. 816,930, Jul. 19, 1977, Pat. No. 4,150,974.

[51] Int. Cl.$^2$ ............................................. C21C 5/46
[52] U.S. Cl. ........................................ 266/99; 75/49; 75/60; 266/90; 266/208
[58] Field of Search .................. 75/60, 49; 266/99, 90, 266/208

[56] References Cited

U.S. PATENT DOCUMENTS

| | | | |
|---|---|---|---|
| 3,663,204 | 5/1972 | Jungwirth | 75/60 |
| 3,708,159 | 1/1973 | De Broy | 266/99 |
| 3,850,416 | 11/1974 | Jackson | 266/99 |
| 4,043,800 | 8/1977 | Mahn | 75/60 |
| 4,102,190 | 7/1978 | Fradeneck | 266/99 |

Primary Examiner—P. D. Rosenberg

Attorney, Agent, or Firm—Cushman, Darby & Cushman

[57] ABSTRACT

One form of the invention discloses an apparatus and a method for positioning the snorkel of a vacuum degassing apparatus beneath the interface of the molten metal and slag in a ladle utilizing means for determining the interface, which means comprises an electrode adapted for positioning within the ladle in electrical contact with the material, indicating means for indicating a first range of voltages produced at said electrode by an electrochemical reaction between the molten metal and the electrode as well as a second range of voltages produced at the electrode by an electrochemical rection between the slag and the electrode, with means for supporting the electrode independently of the ladle and adapted to enable the electrode to be raised or lowered within, and relative to, the ladle, wherein the electrode is moved to a position within the ladle and relative movement is subsequently produced between the electrode and the ladle whereby the position of the interface will be determined by noting a change in the voltage outputs from one range of voltages to the other, and thereafter relative movement between the ladle and the vacuum degassing apparatus is produced to position the lower opening to the snorkel beneath the interface.

8 Claims, 8 Drawing Figures

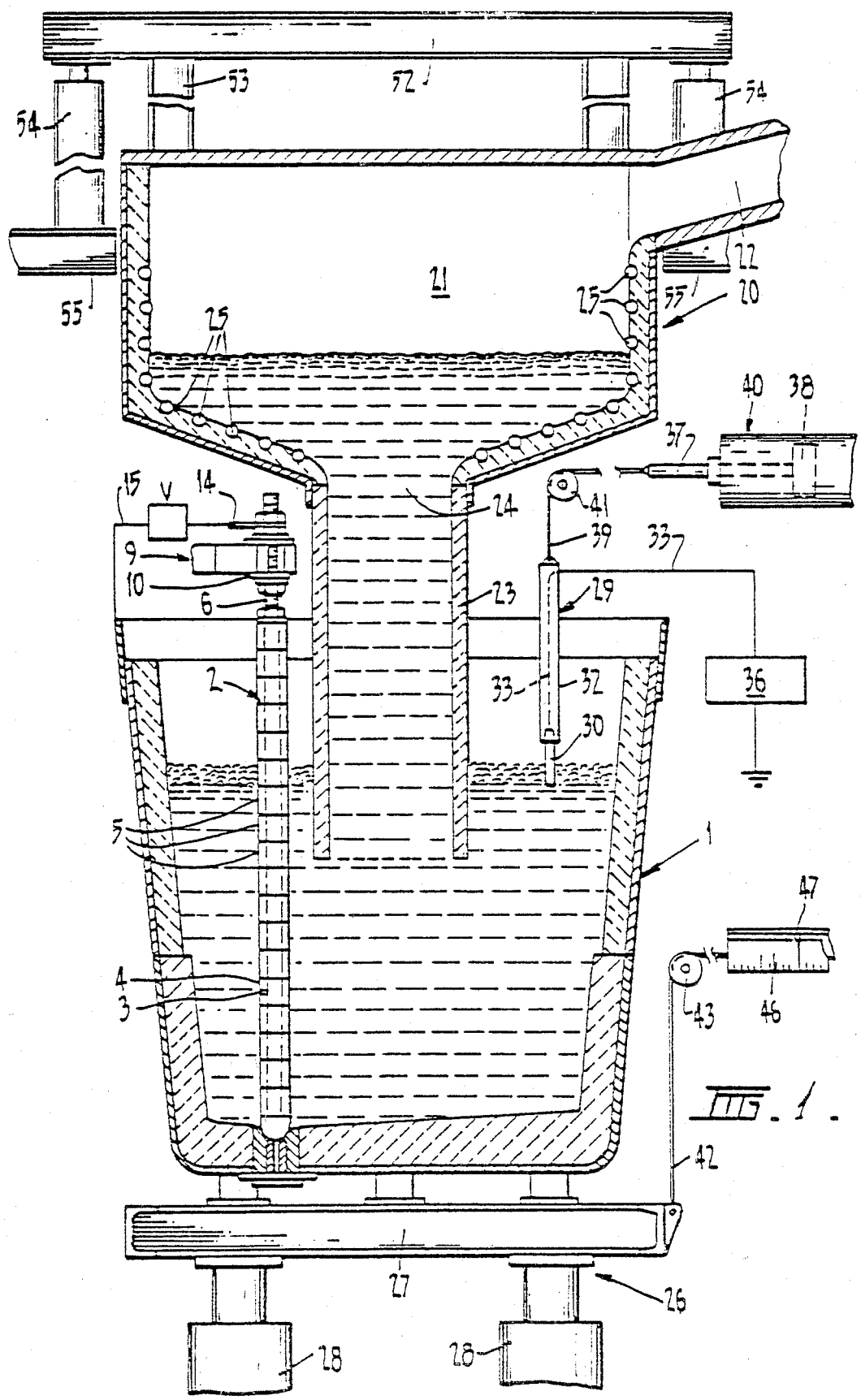

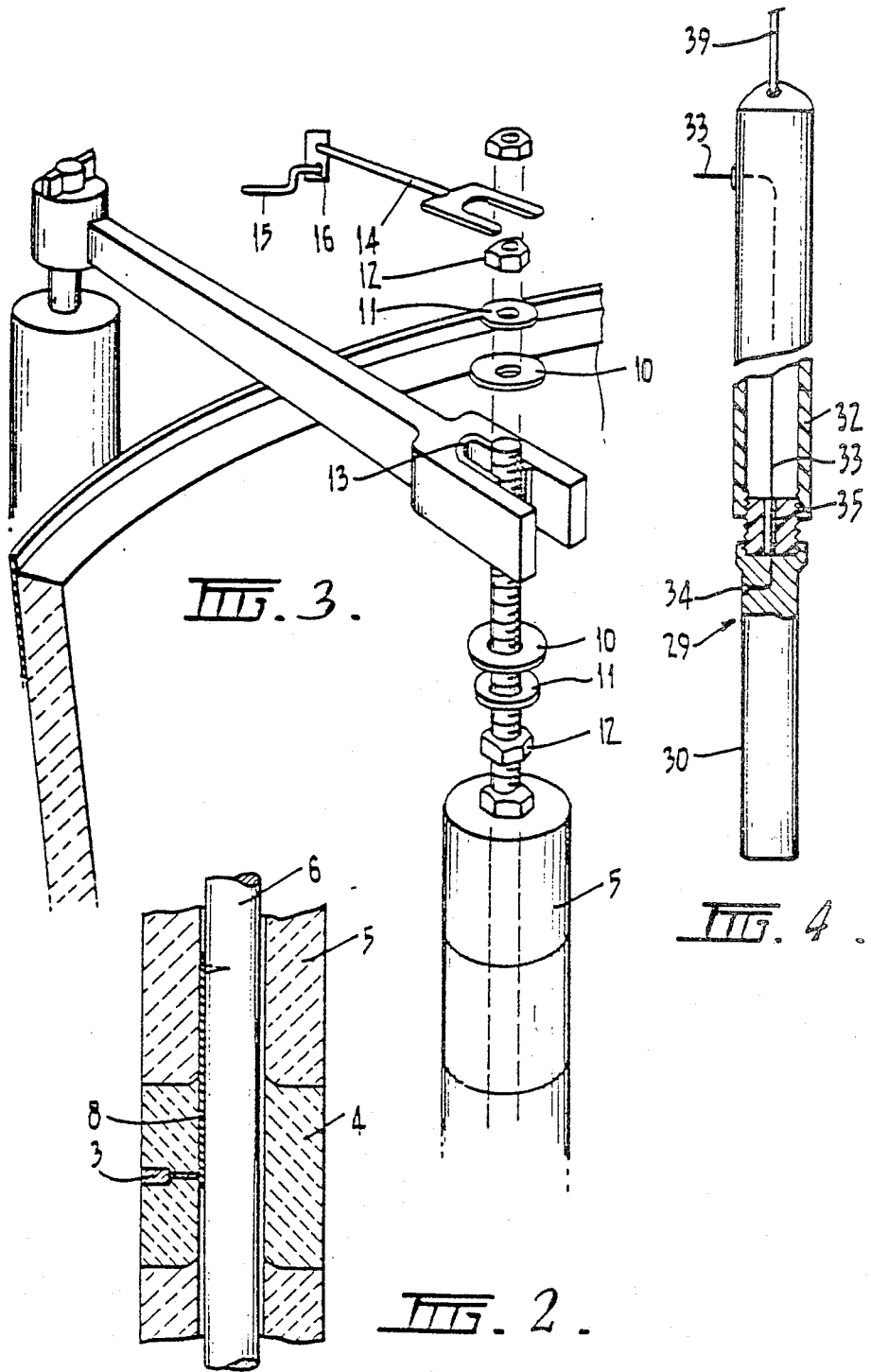

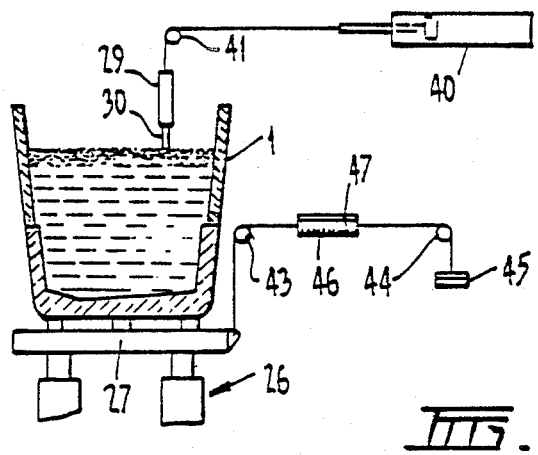
FIG. 5.
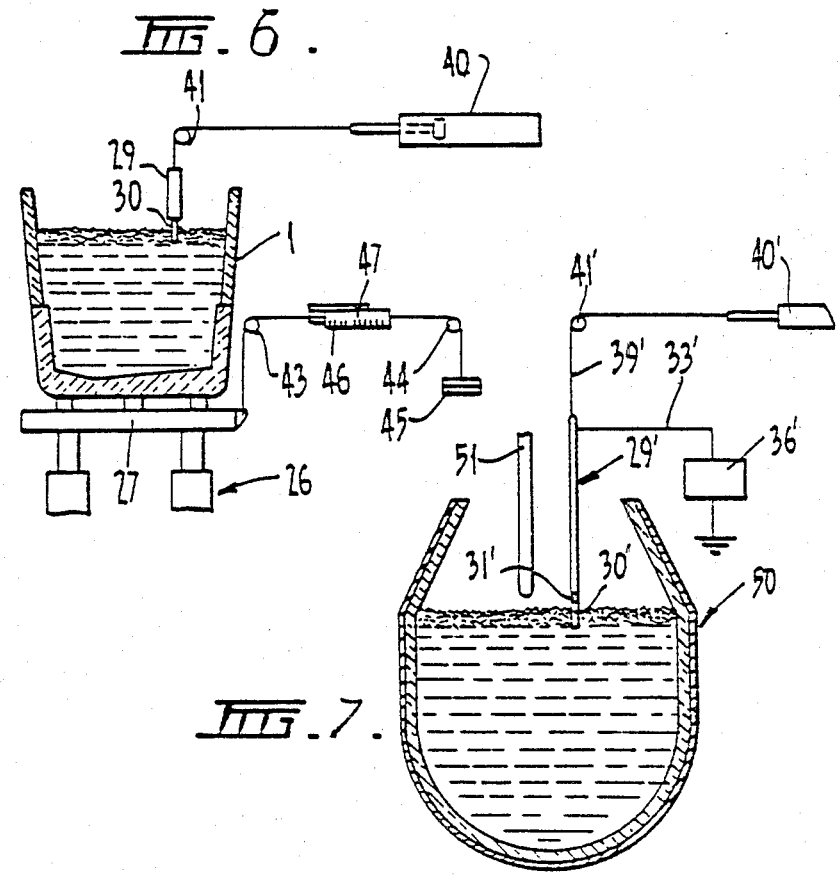
FIG. 6.
FIG. 7.

INDICATION OF LEVELS IN RECEPTACLES

This is a division, of application Ser. No. 816,930 filed July 19, 1977.

The invention relates to a method of, and an apparatus for, indicating the level of a liquid or flowable material, hereinafter termed "liquid", in a receptacle, and more particularly to indicating the level in a ladle of molten metal, that is, the position of the interface between the molten steel and the layer of slag floating thereon and further relates to the type of apparatus disclosed in copending U.S. Patent application No. 577,011 entitled "INDICATION OF LEVELS IN RECEPTACLES" in the names of K. G. KEMLO and C. A. GREGORY.

In the corresponding U.S. Patent application No. 577,011, there is disclosed a method, and an apparatus, for determining the interface between molten metal and slag in a container, which involves the use of an electrode placed at a predetermined position within the container and in electrical contact with the material therein, and measuring and indicating means for measuring a first range of voltages produced at the electrode by an electrochemical reaction between the molten metal and the electrode as well as a second range of voltages produced at the electrode by an electrochemical reaction between the slag and the electrode so that during teeming, as the level of molten metal is lowered to a position adjacent the electrode, the measuring and indicating means will indicate a change in voltage from the first change of voltages to the second range of voltages.

With the method and apparatus of the copending application the electrode was placed at a predetermined fixed position, that is, in one embodiment was placed at a fixed position in the wall of the stopper rod and in another embodiment within a special brick forming the refractory lining of the ladle. Such an arrangement allowed for detection of the interface between the molten metal and the slag in the ladle when the level of the molten metal dropped to a position coincident with the electrode so that thereafter the teeming process could be modified to ensure that only rollable ingot butts were produced.

It has been found that if the above concept is applied to determining the molten metal level in a container other than a teeming ladle during a teeming operation of the type disclosed in the copending application, then the provision of an electrode at a fixed predetermined position within the container is not sufficiently versatile for applications not involving teeming operations.

For example, subsequent to the development of the invention the subject of the copending application, consideration has been given to utilising an electrode sensing device, of the type the subject of the copending application, to determine the interface between the molten metal and the slag in a ladle cooperating with a vacuum degassing apparatus. In a vacuum degassing apparatus the ladle containing the molten metal is placed in a position below a refractory lined vacuum degassing chamber having a refractory lined snorkel extending downwardly therefrom, and the vacuum chamber is lowered, or alternatively the ladle is raised, to a position whereby the lower opening to the snorkel is within the molten metal, whereafter a vacuum is applied within the vacuum chamber to draw up a specific quantity of molten metal into the snorkel. Molten metal is drawn into the snorkel until it reaches a level where its static head is equal to the atmospheric pressure outside the ladle and the ladle is subsequently raised relative to the snorkel so that the metal will enter the vacuum chamber. The walls of the vacuum chamber incorporate heating elements to maintain the metal in a molten condition and the function of the vacuum degassing chamber is to provide a relatively small depth of molten metal with a large upper surface area exposed to the vacuum which ensures rapid elimination of undesirable gases from the metal.

It is important, for maximum efficiency of the degassing operation, that the lower entry end to the snorkel be placed at a depth within the ladle sufficient to ensure that none of the slag layer floating on top of the molten metal enters the snorkel and is drawn into the vacuum chamber, but at the same time the entry to the snorkel should not be placed so deep as to reduce thereby the efficiency of the degassing owing to an excessive amount of metal being degassed during any particular cycle.

It is therefore important to obtain a clear indication of the position of the interface between the molten metal and the slag within the ladle so that the opening to the snorkel can be positioned just sufficiently below the interface to ensure that no slag enters the snorkel.

In order to obtain a clear indication of the position of the interface an electrode, placed at a fixed position within the ladle, either in the stopper rod in the case of a bottom pour ladle, or within the wall of the ladle, as disclosed in the copending application, is not satisfactory as no account can be taken of neither variation in the level of the molten metal within the ladle, or variation in thickness of the layer of slag. This problem did not exist with the arrangement of the copending application which was concerned with teeming operations from a ladle where it was only necessary to determine when the level of molten metal had dropped to a specified height within the ladle, and, as this position was a fixed position, an electrode fixed at the required position was all that was necessary.

In order to meet the problem of locating the interface in a vacuum degassing application it has been found that an electrode can be utilised if the electrode is mounted independently of the ladle and is adapted to be raised and lowered within, and relative to the ladle.

Therefore, in accordance with one aspect of the present invention as applied to a vacuum degassing operation, an electrode is supported within, but independently of, the ladle, and is adapted to be raised and lowered within, and relative to, the ladle, whereby, after the electrode being moved to a position within the ladle, subsequent relative vertical movement between the electrode and the ladle itself causes the electrode to contact the upper surface of the slag layer within the ladle to provide a voltage within a first voltage range indicative of the electrochemical reaction between the slag and the electrode and such voltage will be maintained upon continuation of the relative movement whilst the electrode is in contact with the slag, but upon contact occurring between the molten metal and the electrode at the interface between the slag and the molten metal a new voltage within a second range of voltages will be generated thus establishing the position of the interface. The thickness of the slag layer can then be determined by computing the amount of relative movement that has occurred and the opening to the snorkel of the degassing chamber can then be positioned at such a depth within the molten metal to ensure that no slag is drawn into the degassing chamber.

It has also become apparent that the concept of utilising the electrode to detect changes in the electrochemical properties of the layer as against the molten metal in a container can be applied to assist in the control of a Basic Oxygen Steel-making furnace (BOS furnace). With such an apparatus it is desirable that prior to the oxygen blowing process (for example the previous heat), the position of the metal-slag interface be determined to ensure that the oxygen lance is inserted to a known position along this interface. This distance is normally about 2.0 meters, that is the oxygen lance is positioned at height such that its bottom end is 2 meters above the metal-slag interface. In general the same metallic charge weight is charged to the B.O.S. for all heats so that a reference position of the metal-slag interface from an immediately prior heat is sufficient to allow accurate positioning of the lance for the subsequent heat. This level must be checked from time to time however, as the metal-slag interface changes because of refractory wear on the walls of the furnace, and also because of either wear or buildup (due to slag accumulations) on the bottom of the B.O.S. lining. The above can be accomplished by accurately determining the interface between the slag and the molten metal as with the vacuum degassing situation discussed previously, and as this is also not a matter of determining when the interface reaches a predetermined position as with the apparatus of the copending application, an independently mounted and movable electrode facility is also required and the principle is not limited to application to teeming ladles to ensure the production of rollable ingots, but is applicable to any type of container for molten metal, for example, a B.O.S. furnace.

Therefore, in accordance with a second aspect of the present invention the container is a basic oxygen steel making furnace, wherein the electrode is utilised for determining the metal slag interface at the end of each oxygen blowing operation (and prior to tapping from the furnace), so that the oxygen blowing operation can be better controlled by allowing the oxygen lance tip to be accurately positioned at a fixed distance from the metal slag interface.

Furthermore, although for most practical purposes in the types of apparatus disclosed in the copending application a fixed position for the electrode to enable an indication of the dropping of the molten metal level to a set position within the ladle would be satisfactory, in certain applications it may be desirable to alter the position to which the level of the molten metal may be allowed to drop before any action is taken. For example, with larger ingot moulds the minimum level for subsequent rollable ingots may be higher and thus the electrode which determines when the level has been reached must be positioned higher, whilst for smaller ingot moulds the minimum level for subsequent rollable ingots could therefore be lower and thus the electrode could be positioned lower. Therefore, provision for moving the electrode facility may be of some advantage for allowing variation of ingot teeming operations for a specific ladle to suit a variety of sizes of ingot moulds.

It has also become apparent that it would be of benefit to utilise an electrode of the type under consideration in a tundish for supplying molten metal to the mould of a continuous casting apparatus where supply to the tundish would need to be terminated when the level of the molten metal in the tundish rises to the extent that it may overflow the tundish or else it may fall in the tundish to the extent that some slag may emerge from the tundish and be supplied to the mould, and thus in this respect the invention is also not necessarily limited to the utilisation to teeming ladles supplying conventional ingot moulds, but is applicable to continuous casting applications as well as the B.O.S. furnace application referred to above.

Therefore, in accordance with a third aspect of the invention, the container is a ladle with a bottom pouring facility, or tundish in a continuous casting apparatus, and means are provided externally of said ladle or tundish for supporting said electrode within said ladle or tundish and for imparting vertical movement to said electrode, whereby said electrode may be positioned at a first vertical position within said ladle or tundish to provide an indication of the interface rising or falling to said position, with said electrode being raised to an alternative vertical position within said ladle or tundish to provide an indication of the interface falling to an alternative position during an alternative operation.

Several preferred forms of the invention will now be described with reference to the accompanying drawings in which:

FIG. 1 is a sectional elevational view of a ladle in combination with a vacuum degassing apparatus and incorporating a vertically movable electrode which enables determination of the interface between the molten metal and the slag to ensure correct positioning of the snorkel of the vacuum degassing apparatus, FIG. 2 is an enlarged fragmentary schematic cross-section of section of the stopper rod incorporating an electrode for the purpose of controlling teeming of the ladle, FIG. 3 is an exploded fragmentary view showing the connections to the stopper rod, FIG. 4 is an enlarged fragmentary schematic cross-section of the electrode lance for determining the interface between the slag and molten metal to enable correct positioning of the snorkel of the vacuum degassing apparatus, FIGS. 5 and 6 are schematic representations of that portion of the equipment of FIG. 1 relating to determination of the interface and for determination of the thickness of the slag layer, FIG. 7 is a sectional elevation of a B.O.S. furnace incorporating an oxygen lance and a movable sub-lance incorporating an electrode, and FIG. 8 is a representation of a trace actually produced by a voltage recorder during a trial carried out during determination of the slag thickness in a ladle cooperating with a vacuum degassing apparatus.

Referring to FIG. 1 of the drawings there is shown a teeming ladle 1 with a bottom pouring facility, adapted to cooperate with a vacuum degassing apparatus indicated as 20. In this embodiment of the invention the bottom pour ladle 1 is of the type similar to that described in the copending U.S. Patent application No. 577,011. The teeming ladle 1 has a stopper rod 2 modified in accordance with one embodiment of the invention to include an 8 mm diameter low carbon steel electrode 3 held in a hole in a specially prepared refractory sleeve 4 (FIG. 2) on the stopper rod 2 by means of high temperature cement. This sleeve 4 then forms one of the eighteen standard sleeves 5 on the stopper rod, the special sleeve 4 being located at a predetermined distance from the bottom of the rod 2 as discussed below. The electrode 3 is electrically connected to the steel core 6 of the rod 2 by means of a conductive wire 8 crimped in slits in the end of the electrode 3 and connected to the core 6 by means of a nail explosively driven into the core 6.

As is usual, the upper end of the stopper rod is supported by a gooseneck 9 by means of which the rod 2 is lifted and lowered to control the teeming operation. In the present embodiment the stopper rod 2 is insulated from the gooseneck 9 by means of fibre washers 10 interposed between the fork of the gooseneck 9 and steel washers 11 which act as load distributors for the connecting nuts 12. A fibre sheet 13 is located between the rod 2 and the gooseneck fork. An electrical connecting rod 14 is suitably clamped to the upper end of the core 6 of rod 2 and an electric cable 15 secured to a terminal 16 thereon. The cable 15 is in turn connected to one terminal of a multirange voltage recorder V while the other terminal is connected to the steel shell of the ladle 1 as shown, which steel shell is at ground potential.

In the circuit for current flow (to allow the transmission of the voltage), the stream of molten metal from the ladle during teeming forms part of the circuit. Since the stream of metal electrically contacts the mould into which metal is being teemed when the stopper rod 2 is raised, and the mould is earthed, usually through the rails on which it rests, a path for current flow through to earth exists. All that is needed to complete the circuit is to ground one terminal of the voltage recorder V, by connecting it to the steel shell of the ladle as shown in FIG. 1. When the stream of molten metal has been shut-off by moving the stopper rod 2 to the closed position, current still flows, but from the electrode to the steel shell of the ladle through the refractory lining, and therefor from the steel shell to earth. The current flow is of course different when the stopper rod is closed as compared with open. Typically a resistance of 10 ohms exists in the circuit when the stopper rod is open, and 10,000 ohms when it is closed.

As discussed in the specification of the copending application preliminary trials were conducted using a carbon electrode in a series circuit with a battery for driving a current through the molten steel. However, it was found that the carbon was reactive with the steel and this combined with the applied potential failed to produce completely acceptable results although the method may well be capable of application to other conductive liquids. Further experimentation confirmed the existence of a measurable e.m.f. at a passive electrode, such as low carbon steel, due to the electrochemical potential difference between the steel and slag phases.

When the steel electrode 3 is surrounded by molten steel, the equilibrium constant K for the reaction Fe(-Solid) Fe(liquid) is close to unity. As the electromotive force E° is proportional to LnK, E° is very small. Therefore, during the teeming of any ingot before the control ingot, the voltage measured at the electrode is close to zero. The small variations of this measured voltage from heat to heat are largely the result of the variations in oxygen concentration, which determines the extent of the Fe/FeO reaction. When electrode 3 becomes immersed in slag, the reaction Fe(Solid) FeO (liquid slag) applies. K, the equilibrium constant, is different for this reaction and from the relationship $E = aL$ (where a is a contact) E is therefore different when the slag is in constant with the electrode.

The manner in which the above apparatus may be utilised to control the teeming operation to ensure the production of rollable ingot butts is described in detail in the copending application Ser. No. 577,011.

An alternative electrode placement for controlling the teeming operation is also described with reference to FIGS. 7 and 8 in the specification of the copending application and involved replacing one of the ladle bricks by a special brick having a steel, carbon or molybdenum electrode secured therein in a manner similar to that described above. The special brick is preferably located at the centreline of the ladle trunnions to reduce errors caused by tilting of the ladle. The electrode has a lead wire suitably attached thereto and extends between the bricks and the safety lining to a terminal on the lining. A further lead wire is then connected from the terminal to a voltage recorder as before.

It was found that this alternative electrode placement achieves better results than the first form described above. The mode of operation of this alternative electrode placement is substantially identical to that described above.

In other modifications, the lead wire from the stopper rod or electrode to the recorder may be replaced by a transmitter/receiver system. The insulation of the gooseneck as described may be replaced by completely insulating the entire stopper rig from the ladle.

The system described above may also be modified to sense both the metal/slag and slag/air interfaces to thereby enable the mass of the slag to be estimated. In this respect it will be understood that the word "liquid" is introduced to embrace both molten metals and slags as well as other liquids.

Referring to FIG. 1 of the drawings, the teeming ladle is shown cooperating with a vacuum degassing apparatus 20, whereby the contents of the ladle may be subjected to a vacuum degassing prior to teeming the contents of the ladle into ingot moulds.

The vacuum degassing apparatus 20 comprises a refractory lined vacuum chamber 21 having an upper outlet 22 therefrom connected to a vacuum pump means (not shown), and a snorkel 23 of ceramic material extends downwardly from a bottom opening 24 in the vacuum chamber. The vacuum chamber and snorkel combination 21, 23 is supported on a support structure including an overhead lifting frame 52, connected to the vacuum degassing apparatus 20 by vertical members 53, whilst hydraulic rams 54 are provided between the overhead lifting frame 52 and a surrounding support frame 55. Carbon heating elements 25 are provided embedded in the refractory lining of the vacuum degassing chamber to maintain molten steel drawn into the degassing chamber at an elevated temperature sufficient to ensure that the metal remains in a molten condition.

It is normal practice to lower the vacuum degassing apparatus to a position where the lower opening to the ceramic snorkel 23 is within the metal bath in the ladle 1, whereafter vacuum is applied to the vacuum chamber 21 thus drawing molten metal from the ladle up into the ceramic snorkel. The lower opening of the snorkel is covered with a thin steel cap to prevent slag entering the snorkel as the snorkel is lowered through the slag layer into the metal. On contacting the metal, this cap melts. The metal rises up through the snorkel 23 until the level of the metal surface within the snorkel is such that the static head of metal in the snorkel is equal to the atmospheric pressure acting on the contents of the ladle.

Thereafter, the ladle 1 is raised relative to the snorkel 23 to allow the metal to enter the vacuum chamber 21.

The depth of metal within the vacuum chamber 21 is relatively small, but a large upper surface area of metal is exposed to vacuum within the vacuum chamber and enables rapid elimination of undesirable gases from the metal.

The ladle is raised and lowered on a platform arrangement 26 comprising a platform 27 upon which the ladle 1 is placed and a pair of hydraulic rams 28 are provided beneath the platform 27 to enable the platform, and therefore the ladle, to be raised and lowered as required. Only about 10% of the ladle contents are usually drawn into the upper chamber during in any one degassing cycle, and therefore usually about 10 cycles are sufficient to ensure complete degassing for the entire contents of the ladle.

As mentioned previously it is important for maximum efficiency of the degassing operation that the end of the snorkel 21 be placed at a depth in the metal in the ladle 1 sufficient to ensure that none of the slag layer enters the snorkel, but the depth should not be so great as to reduce the efficiency of the degassing by an excessive amount of metal being degassed during one cycle. However, owing to variation in the thickness of the slag layer it is not possible to accurately control the position of the snorkel relative to the interface between the metal and the slag because the interface cannot be seen. When the immersion depth is not sufficient, slag enters the snorkel and floats to the top of the metal in the degassing chamber where it contacts the carbon heating elements and the refractory lining. The heating elements are very susceptible to attack by molten slag and are expensive and time consuming to replace. Also, the very large amount of oxygen present in the slag as compared to molten metal also very seriously reduce the efficiency of a vacuum degassing process.

In order to meet this problem, and in accordance with this preferred form of the invention, an additional electrode sensing facility is provided to accurately determine the position of the interface between the slag and the metal in the ladle 1 prior to positioning of the snorkel.

Referring to FIGS. 1 and 4-6 of the drawings, the additional electrode facility indicated as 29 includes a lower electrode in the form of a metal pipe or tube 30 carrying an ebonite insulating plug 31 in its upper end, which plug is threadably received within the lower end of an upper elongate lance 32 in the form of a pipe. An electrical wire 33 is attached to the electrode 30 at a point 34 as shown, and extends up through a hole 35 through the plug 31 and then up through the upper elongate lance 32 and outwardly therefrom to be coupled to a voltage recorder 36, which may be a potentiometric recorder or voltage activated light, with the other side of the recorder being earthed as shown.

The circuit for current flow is completed by a current flow existing between the electrode 30 and the steel shell of the ladle 1 through the refractory lining which is at ground potential. The electrical resistance between the contents of the ladle 1, and the earth (to which the recorder 36 is also connected at one of its terminals) should not be more than about 20,000 ohms, and therefore, if necessary, additional means to ensure the contents of the ladle are reasonably well earthed may be provided, and the earth wire 15 leading from the stopper rod 2 to the steel shell of the ladle 1 through the recorder V, will suffice. In the alternative embodiment where the electrode 3 is secured in a ladle brick the lead wire again, if necessary, can be connected to the steel shell of the ladle 1. Another technique could involve the use of pure carbon in the head of the stopper rod 2, and this would ensure good electrical contact with the steel shell of the ladle 1, which is itself earthed.

The upper end of the elongate lance 32 is connected via a cable 39 and a rigid extension 37 to the piston 38 of a reversible hydraulic ram arrangement 40 and as shown the cable 39 extends over a pulley 41. The hydraulic ram arrangement 40 can be actuated in either direction to accordingly raise or lower the electrode facility 29 as required.

When the electrode 30 is lowered into contact with the slag layer a voltage reading is provided by the recorder (typically 200 to 250 millivolts) and upon further lowering of the electrode the voltage output falls to about 20 to 50 millivolts when the molten steel is contacted at the surface between the steel and the slag. The vertical position of the electrode facility is visually noted when the interface is reached and compared with the vertical position of the ladle, whereafter the bottom opening to the snorkel, which is at a fixed position, is then at a known vertical distance from the metal-slag interface and the ladle 1 can then be raised by the required distance by the operator actuating the hydraulic feed to the rams 28, to ensure that no slag enters the snorkel during the following vacuum degassing operation.

As an alternative, or in addition to, determining the depth of the slag layer by comparing the position of the electrode facility 29 with the ladle 1, a scale measuring device may be used coupled to the platform 27 of the lifting platform arrangement 26 and comprising a cable 42 extending upwardly from the platform 27 over a pulley 43 to then extend horizontally before passing over a further pulley 44 and downwardly where it is connected to a counterweight 45. The section of the cable 42 between the two pulleys 43 and 44 carries a scale 46 lying adjacent a fixed scale pointer 47. With such a provision the electrode facility 29 is lowered into the ladle until a voltage reading results as an indication that the electrode 30 has contacted the upper surface of the slag layer. The scale reading for the vertical position of the platform 27, and thus the ladle 1, is noted, and the platform and the ladle are then raised until a voltage reading is provided by the electrode facility to indicate that the electrode 30 has reached the metal-slag interface, whereafter the new scale reading is noted and the difference from the initial reading computed to give an accurate determination of the thickness of the slag layer.

FIG. 8 of the drawings is a representative of a trace as actually produced by a voltage recorder during a trial carried out, and as shown the voltage reading is close to zero during the lowering of the electrode 30, but upon contacting the upper surface of the slag layer rises sharply to in the order of 250 millivolts and maintaining a voltage of between 200 and 250 millivolts whilst in contact with the slag during the subsequent raising of the platform and ladle, until contact is made with the metal-slag interface where the voltage drops sharply to approximately 30 millivolts which value is maintained whilst the electrode is in direct contact with the metal. During the test as represented by FIG. 8, the scale reading upon the electrode contacting the surface of the slag was approximately 15 cm, and at the time of the voltage drop upon contact with the metal-slag interface, the scale reading had increased to 30 cm, indicating a slag thickness of in the order of 15 cm. Changes in voltage of the same magnitude can be expected during subsequent teeming of the ladle, when the level drops to the electrode 3 on the stopper rod 2, except that the voltage reading will be in the order of 30 millivolts during teeming until the metal-slag interface drops to the level of the electrode 3 at which point a voltage jump to 200–250 millivolts will be recorded at the voltage recorder V.

Provision may be provided to allow the exact position of the ladle to be known at all times, so that the point of contact with the slag and subsequently to steel can be related to specific ladle heights automatically.

Such a provision will allow the ladle to be raised in a continuous fashion without the need to stop and take readings from a mechanical scale measuring device, and a direct readout of the depth of the slag layer in addition to the metal slag interface position, and the ladle can thus be raised to the optimum position for the vacuum degassing operation.

In a further alternative the ladle 1 can be maintained at a fixed vertical position and after the metal-slag interface is detected, the vacuum degassing can be lowered to allow positioning of the opening to the snorkel at the required depth within the molten steel.

Referring to FIGS. 7 and 8 of the drawings, there is shown a schematic representation of a B.O.S. furnace in an upright position as shown in FIG. 7.

As stated previously, with a B.O.S. furnace it is important to ensure correct positioning of the oxygen lance above the bath of steel in the furnace, which requires an accurate determination of the slag-steel interface and, as shown in FIG. 7, the B.O.S. furnace is generally indicated as 50 and is in an upright position. It has an electrode identical with that described and illustrated with reference to FIGS. 1 to 6 of the drawings, that is, it has an electrode 30′, an insulating plug 31′, an upper elongate lance 32′, an electrical wire connection 33′ to a voltage recorder 36′, a cable 39′, hydraulic ram arrangement 40′ and pulley 41′. The metal-slag interface is determined in the same manner as described with reference to FIGS. 1 to 6 of the drawings such as to enable positioning of the oxygen lance 51 at the correct height above the metal layer.

Furthermore, an electrode facility similar to 29 in FIGS. 1 to 6 may be incorporated in the tundish or vessel for supplying metal to the mould of a continuous casting apparatus, and would be adapted to reside adjacent the bottom of the tundish or vessel such as to provide an indication of when the metal-slag interface drops to such an extent that supply of metal from the tundish to the continuous casting mould should be terminated to ensure that none of the slag within the ladle flows from the tundish and into the continuous casting mould, nor that the interface rises to such an extent (as supplied from a ladle) that the metal overflows the tundish or vessel. It will be appreciated that the earthing arrangement in the tundish embodiment is identical to the ladle teeming arrangement where the electrical current flow is via the stream of molten steel, in this case into the continuous casting mould.

I claim:

1. An apparatus for determining the interface between molten metal and slag in a container, comprising a container, an electrode adapted for positioning within said container in electrical contact with the material in the container, and indicating means for indicating at least a first range of voltages produced at said electrode by an electrochemical reaction between said molten metal and said electrode as well as at least a second range of voltages produced at said electrode by an electrochemical reaction between said slag and said electrode, means for supporting said electrode independently of said ladle, and adapted to enable said electrode to be raised or lowered within, and relative to, said container whereby, after moving said electrode to a position within said container, subsequent relative movement between said electrode and the material in said container will allow said indicating means to determine a situation where the electrode and the interface are at the same level in said container by indicating a change in voltage from one of said range of voltages to the other.

2. An apparatus as claimed in claim 1, wherein the container is bottom pour ladle from which the molten metal component is to be teemed through a bottom pour opening, and means are provided within said ladle to selectively open and close said bottom pour opening, and means are provided within said ladle to selectively open and close said bottom pour opening, and wherein said electrode is moved to a predetermined distance from the bottom of said ladle to determine when said interface drops to the same level as the electrode whereafter the teeming operation may be modified.

3. A combination of a ladle and a vacuum degassing apparatus supported independently of said ladle and comprising a vacuum degassing chamber coupled to an evacuating means and having a snorkel extending downwardly from the bottom thereof with a lower opening to said snorkel being adapted to be immersed within the material in said ladle, means for achieving relative vertical movement between said ladle and said vacuum degassing apparatus, means for determining the interface between the molten metal and slag in the ladle and comprising an electrode adapted for positioning within said ladle in electrical contact with the material in the ladle, indicating means for indicating at least a first range of voltages produced at said electrode by an electro-chemical reaction between said molten metal and said electrode as well as at least a second range of voltages produced at said electrode by an electrochemical reaction between said slag and said electrode, means for supporting said electrode independently of said ladle and adapted to enable said electrode to be raised or lowered within, and relative to, said ladle, whereby after moving said electrode to a position within said ladle, subsequent relative movement between said electrode and said ladle allows said indicating means to determine the position of the interface by indicating a change in voltage from one of said range of voltages to the other.

4. The combination as claimed in claim 3, wherein the means for achieving relative vertical movement between said ladle and said vacuum degassing apparatus is a platform means on which said ladle is adapted to be placed and incorporating hydraulic ram means to raise and lower said platform means and therefore the ladle when situated thereon.

5. The combination as claimed in claim 4, wherein said platform means is coupled to means for measuring the amount of vertical movement of said platform means and therefore the ladle when situated thereon.

6. The combination as claimed in claim 5, wherein said means for measuring the amount of vertical movement of said platform means, is a cable coupled to said platform means and cooperating with a scale and pointer arrangement whereby upon movement of said platformmeans the resulting movement of said cable will cause relative movement between said scale and said pointer equivalent to the distance moved by the platform.

7. A combination of a Basic Oxygen Steel-making furnace incorporating an oxygen lance and an apparatus for determining the interface between molten metal and slag in the furnace and comprising an electrode adapted for positioning within said furnace in electrical contact with the material in the furnace, indicating means for indicating at least a first range of voltages produced at said electrode by an electrochemical reaction between said molten metal and said electrode as well as at least a second range of voltages produced at said electrode by an electrochemical reaction between said slag and said electrode, means for supporting said electrode independently of said furnace and adapted to enable said electrode to be raised or lowered within, and relative to, said furnace, whereby after moving said electrode to a position within said furnace, subsequent relative movement between said electrode and said furnace allows said indicating means to determine the position of the interface by indicating a change in voltage from one of said range of voltages to the other.

8. The combination as claimed in claim 7, wherein the means for supporting and raising and lowering said electrode includes a cable one end of which is coupled to said electrode and the other end of which is coupled to a reversible hydraulic ram.

* * * * *